United States Patent
Bar-Tal et al.

(10) Patent No.: US 12,521,185 B2
(45) Date of Patent: Jan. 13, 2026

(54) VISUALIZING A QUALITY INDEX INDICATIVE OF ABLATION STABILITY AT ABLATION SITE

(71) Applicant: BIOSENSE WEBSTER (ISRAEL) LTD., Yokneam (IL)

(72) Inventors: Meir Bar-Tal, Haifa (IL); Alona Sigal, Beit Hanania (IL); Aharon Turgeman, Zichron Ya'acov (IL); Liron Shmuel Mizrahi, Kiryat Bialik (IL); Eid Zaknoun, Jish (IL); Erez Silberschein, Tel Aviv (IL)

(73) Assignee: BIOSENSE WEBSTER (ISRAEL) LTD., Yokneam (IL)

( * ) Notice: Subject to any disclaimer, the term of this patent is extended or adjusted under 35 U.S.C. 154(b) by 187 days.

(21) Appl. No.: 17/749,674

(22) Filed: May 20, 2022

(65) Prior Publication Data

US 2023/0404676 A1 Dec. 21, 2023

(51) Int. Cl.
*A61B 34/20* (2016.01)
*A61B 18/00* (2006.01)
*A61B 18/14* (2006.01)
*A61B 90/00* (2016.01)

(52) U.S. Cl.
CPC .......... *A61B 34/20* (2016.02); *A61B 18/1492* (2013.01); *A61B 90/37* (2016.02); *A61B 2018/00351* (2013.01); *A61B 2018/00577* (2013.01)

(58) Field of Classification Search
CPC . A61B 34/20; A61B 18/1492; A61B 18/1206; A61B 90/37; A61B 2018/00351; A61B 2018/00577; A61B 2018/00357; A61B 2018/00613; A61B 2018/00678; A61B 2018/00839; A61B 2018/00898; A61B 2018/00982; A61B 2090/061; A61B 2090/065

See application file for complete search history.

(56) References Cited

U.S. PATENT DOCUMENTS

| | | |
|---|---|---|
| 5,391,199 A | 2/1995 | Ben-Haim |
| 6,129,669 A | 10/2000 | Panescu |
| 6,239,724 B1 | 5/2001 | Doron et al. |
| 6,332,089 B1 | 12/2001 | Acker et al. |
| 6,484,118 B1 | 11/2002 | Govari |
| 6,618,612 B1 | 9/2003 | Acker et al. |
| 6,690,963 B2 | 2/2004 | Ben-Haim et al. |
| 9,498,147 B2 | 11/2016 | Massarwa |

(Continued)

FOREIGN PATENT DOCUMENTS

WO 9605768 A1 2/1996

OTHER PUBLICATIONS

International Search Report for corresponding PCT Appln. No. PCT/IB2023/054595 dated Jul. 26, 2023.

*Primary Examiner* — Peter Luong (57) ABSTRACT

A system including a display and a processor. The processor is configured to: (i) receive multiple position measurements indicative of respective positions of an ablation electrode at respective times during an ablation procedure at an ablation site in an organ of a patient, (ii) estimate, based at least on the multiple position measurements, a quality index indicative of a stability of the ablation procedure at the ablation site, and (iii) visualize the quality index to a user on the display.

4 Claims, 3 Drawing Sheets

(56) References Cited

U.S. PATENT DOCUMENTS

| | | |
|---|---|---|
| 9,757,182 B2 | 9/2017 | Bustan |
| 2002/0065455 A1 | 5/2002 | Ben-Haim et al. |
| 2003/0120150 A1 | 6/2003 | Govari |
| 2004/0068178 A1 | 4/2004 | Govari |
| 2009/0093806 A1 | 4/2009 | Govari |
| 2009/0138007 A1 | 5/2009 | Govari |
| 2013/0296845 A1* | 11/2013 | Bar-Tal .................... A61N 1/06 606/34 |
| 2015/0342662 A1* | 12/2015 | Bustan ................... A61B 34/10 606/34 |
| 2019/0038348 A1* | 2/2019 | Koblish ............... A61B 5/4836 |
| 2021/0346103 A1 | 11/2021 | Stranjak |
| 2022/0183669 A1 | 6/2022 | Bar-Tal |

\* cited by examiner

VISUALIZING A QUALITY INDEX INDICATIVE OF ABLATION STABILITY AT ABLATION SITE

FIELD OF THE DISCLOSURE

The present disclosure relates generally to tissue ablation, and particularly to methods and systems for visualizing to a user a quality index indicative of ablation stability at an ablation site.

BACKGROUND OF THE DISCLOSURE

Various techniques estimating and visualizing stability of a tissue ablation procedure have been published.

For example, U.S. Pat. No. 6,129,669 describes systems and methods to sense stability of an ablation instrument inside a body region. The systems and methods position a tracking element in a fixed location spaced from the ablation instrument. The systems and methods generate an output, which varies according to movement of the ablation instrument relative to the tracking element over time.

U.S. Patent Application Publication No. 2021/0346103 describes a system for supporting a medical intervention, a method for output of a feedback signal, and a computer program product are provided. The system includes a feedback device for output of a feedback signal to a user of an intervention apparatus, and a control device for controlling the feedback device. The control device is configured to receive an actual position of the intervention apparatus and a target position of the intervention apparatus. The control device is further configured to determine a deviation of the actual position from the target position and to control the output of the feedback signal by the feedback device as a function of the deviation.

BRIEF DESCRIPTION OF THE DRAWINGS

The present disclosure will be more fully understood from the following detailed description of the examples thereof, taken together with the drawings in which.

DETAILED DESCRIPTION OF EXAMPLES

Overview

Some medical procedures require the application of ablation signals to tissue of a patient organ. For example, radiofrequency (RF) ablation signals may be applied to heart tissue at an ablation site for treating arrhythmia.

The tissue ablation is intended to transform the tissue into a lesion adapted to block undesired propagation of an electrophysiological wave through the tissue intended to be ablated. In response to the ablation, tissue cells die, and at least part of the ablated tissue is transformed to the lesion. In order to block the propagation of the electrophysiological wave, a physician that performs the ablation, typically defines an ablation line (or ring) comprising multiple ablation sites, and uses one or more ablation electrodes of a catheter placed in contact with the tissue, to apply the ablation signal to the tissue at each ablation site for obtaining a suitable lesion. In some cases, however, the ablation electrode may undesirably move relative to the tissue while applying the ablation signal at a given ablation site. Such movements reduce the stability of the ablation electrode relative to the tissue at the ablation site, and therefore, may reduce the quality of the lesion and leave gaps in the ablation line that may not fully block the propagation of the electrophysiological wave.

Moreover, while applying the ablation signal, the physician needs an indication of the stability relative to the ablated tissue. In this context, the term stability refers to the allowed movement speed and allowed distance between: (i) a first position, e.g., the position of the ablation electrode when the physician started to apply the ablation signal, and (ii) one or more second positions at which the ablation electrode visited while applying the ablation signal.

Examples of the present disclosure that are described hereafter provide methods and system for improving the estimation and visualization of a quality index indicative of ablation stability at an ablation site.

In some examples, a system for applying ablation pulses to patient heart comprises: (i) a power source, such as a radiofrequency (RF) generator configured to produce ablation signals, (ii) a catheter, which is electrically connected to the RF generator and comprising at least: (a) an ablation electrode configured to apply the ablation signals to tissue placed in contact therewith, and (b) a position sensor, which is configured to produce position signals indicative of measured position of the ablation electrode in the heart, (iii) a display, and (iv) a processor, which is configured to display the position of the ablation electrode over a map of the patient heart. The components of the system are described in detail in FIG. 1 below.

In some examples, the processor is configured to receive multiple position measurements indicative of respective positions of the ablation electrode at respective times during the ablation procedure at an ablation site in the patient heart. The processor is configured to receive a reference position, which is the position of the ablation electrode when beginning to apply the ablation signal to the tissue at the ablation site. The processor is further configured to hold thresholds indicative of: (i) the allowed distance between the reference position and the multiple measured positions of the ablation electrodes while applying the ablation signal, and (ii) the allowed velocity of the ablation catheter relative to the reference position. The above operation is described in detail in FIGS. 2 and 4 below.

In some examples, based on the multiple position measurements, the reference position, and the thresholds, the processor is configured to estimate a quality index (also referred to herein as an ablation stability quality index) indicative of the stability of the ablation procedure at the ablation site. In this context, the term "stability" refers to the measured distance and velocity relative to the threshold(s) indicative of the allowed distance and velocity. In other words, the processor is configured to estimate the quality index depending on respective distances of at least some of the measured positions from the reference position, and/or depending on the estimated velocity of the ablation electrode while applying the ablation signal at the ablation site, the estimations are described in detail in FIG. 2 below.

In some examples, the processor is configured to visualize the quality index to the physician (and any other user) on the display of the system. For example, while ablating the tissue at a given ablation site, the processor is configured to display t the given ablation site, a spherical-shaped or spheroidic-shaped icon, also referred to herein as a visitag icon. The processor is further configured to assign to the visitag icon a color indicative of the value of the respective ablation stability quality index relative to a threshold of the ablation stability quality index, as shown and described in detail in FIG. 2 below.

In some examples, in response to identifying that the value of the ablation stability quality index exceeds the respective threshold, the processor 33 is configured to display a halo around the respective visitag icon. In the present example, the halo may be displayed for about 3 seconds and indicates termination of the ablation at the location marked by the visitg icon, and immediately after the halo disappears, the processor produces a new visitag icon whose calculated center-of-mass is at the measured present position of the ablation electrode. The halo and new visitag icon provide the physician with an indication of the stability and status of the ablation procedure at the respective ablation site, as will be described in more detail in FIG. 2 below.

Figure 2:
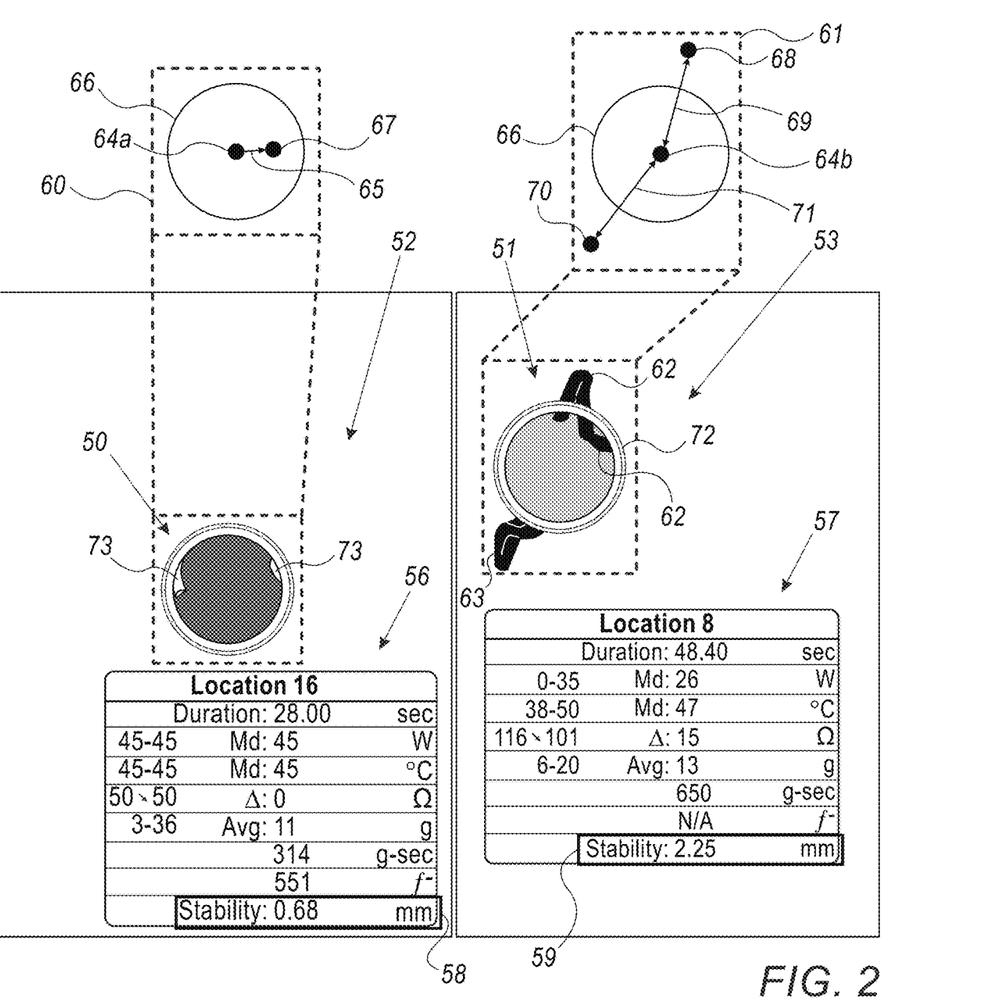
FIG. 2 is a diagram illustrating annotation of ablation sites on a map of patient heart, in accordance with examples of the present disclosure.

In some examples, in case the estimated distance of a given position of the ablation electrode (during the ablation) from the reference position exceeds the distance threshold, the processor calculates and displays one or more contours, which are based on the positions visited by the ablation electrode, and are indicative of the respective contours travelled by the ablation electrode while applying the ablation signals to the tissue at the given ablation site.

In some examples, the processor is configured to display to the physician, a table comprising respective values of the calculated ablation stability quality index. In alternative examples, the processor is configured to display over a map of the heart any suitable information selected by the physician. For example, the processor may display over the map 27 at the given ablation site: (i) a distal-end assembly of the catheter (which comprises the ablation electrode), (ii) the visitag icon indicative of the outcome of the ablation at the given ablation site, (iii) the ablation stability quality index at the given ablation site, and (iv) any other suitable information related to the ablation, such as but not limited to an ablation index calculated based on the main parameters of the ablation.

The disclose technique provide the user(s) of the system (e.g., the physician) with a real-time indication of the stability of the ablation procedure, so that in case the ablation stability quality index exceeds the respective threshold, the physician may start a corrective action for improving the quality of the lesion formed in the heart.

System Description

Figure 1:
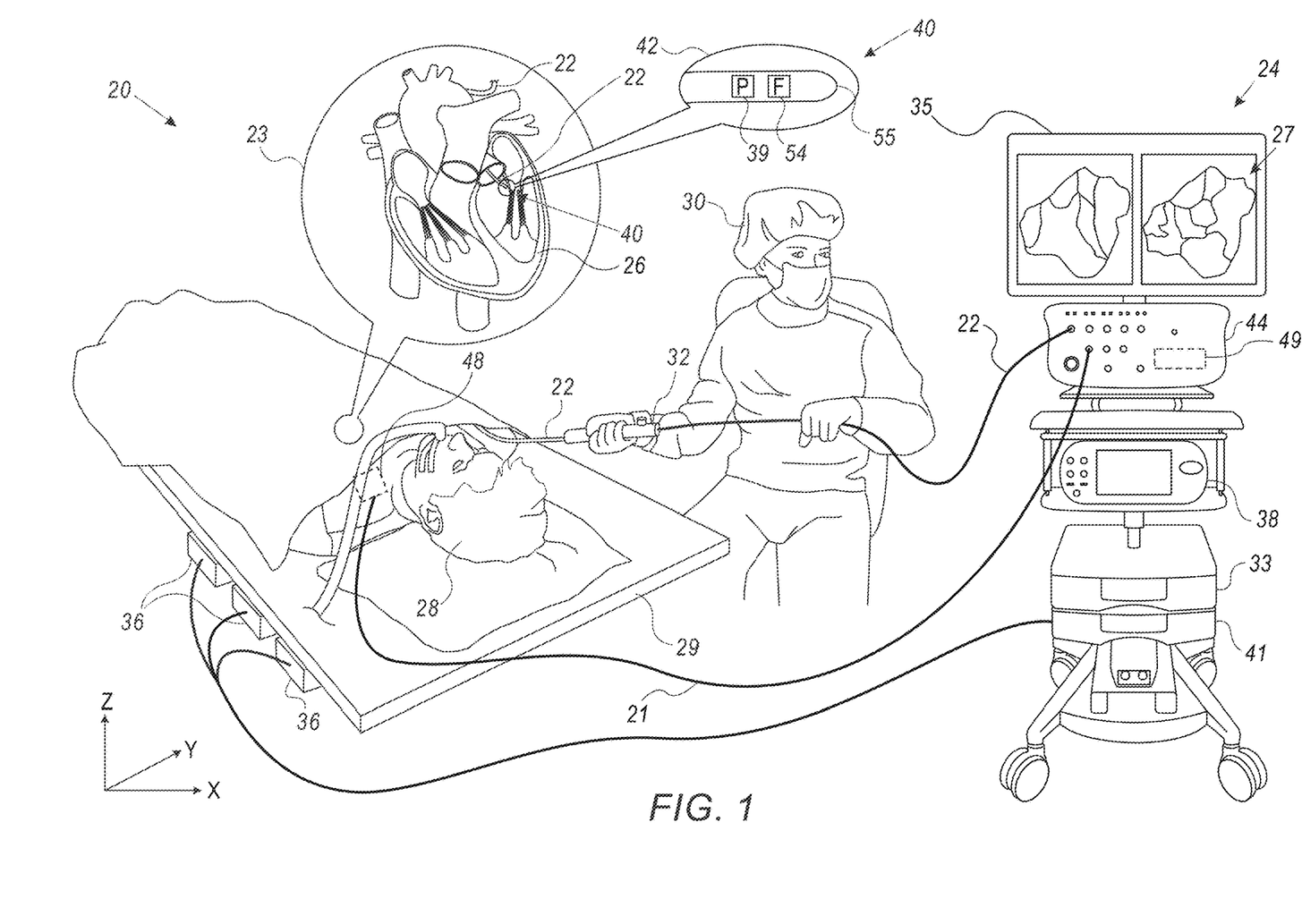
FIG. 1 is a schematic, pictorial illustration of a catheter-based tracking and ablation system, in accordance with an example of the present disclosure.

FIG. 1 is a schematic, pictorial illustration of a catheter-based tracking and ablation system 20, in accordance with an example of the present disclosure.

In some examples, system 20 comprises a catheter 22, which is configured to carry out cardiac procedures, and a control console 24. In the example described herein, catheter 22 comprises a focal catheter that may be used for any suitable therapeutic and/or diagnostic purposes, such as sensing electro-anatomical signals and/or ablation of tissue in a heart 26 (inset 23) as will be described in detail hereinafter. In the context of the present disclosure and in the claims, the term "ablation" refers to a radiofrequency (RF) ablation procedure or to an irreversible electroporation (IRE) procedure. These procedures are intended to apply one or more high-voltage unipolar or bipolar electrical pulses to one or more electrodes in contact with tissue to be ablated, so as to form a lesion in the target location (also referred to herein as an ablation site) in heart 26, and thereby to treat arrhythmia in the heart.

In some examples, console 24 comprises a processor 33, typically a general-purpose computer, with suitable front end and interface circuits for receiving signals via catheter 22 and for controlling the other components of system 20 described herein. Console 24 further comprises a user display 35, which is configured to receive from processor 33 graphical and/or textual display items, such as a map 27 of heart 26, and to display map 27.

In some examples, map 27 may comprise any suitable type of three-dimensional (3D) anatomical map produced using any suitable technique. For example, the anatomical map may be produced using an anatomical image produced by using a suitable medical imaging system, or using a fast anatomical mapping (FAM) technique available in the CARTO™ system, produced by Biosense Webster Inc. (Irvine, Calif.), or using any other suitable technique, or using any suitable combination of the above.

In some examples, console 24 comprises a recording unit 38, which is configured to record in case of failure in the CARTO™ and/or a failure to pace in certain electrodes. Console 24 comprises a patient interface unit (PIU) 44, which is configured to produce a signal indicative of the location and electrocardiogram (ECG) signals that are acquired and processed and to exchange signals between console 24 and multiple entities (e.g., catheter 22) of system 20.

Reference is now made to an inset 23. In some examples, prior to performing an ablation procedure, a physician 30 inserts one or more catheters through the vasculature system of a patient 28 lying on a table 29, so as to perform electro-anatomical (EA) mapping of tissue in question of heart 26. Based on the EA mapping, physician 30 plans the ablation or IRE procedure, which is carried out using focal catheter 22.

Reference is now made to an inset 42. In some examples, catheter 22 comprises a distal-end assembly (DEA) 40 having one or more ablation electrodes 55 configured to apply the ablation signal to the tissue of heart 26. Catheter 22 further comprises a position sensor 39, which is typically coupled to the distal end of catheter 22 and is configured to produce position signals indicative of the measured position of DEA 40, and more specifically, of ablation electrode(s) 55 in an XYZ coordinate system, as will be described in detail hereinafter.

In some examples, DEA 40 comprises a contact force sensor, refers to herein as a force sensor 54, which is configured to measure a force applied by DEA 40 of catheter 22 to the endocardial tissue of heart 26. Force sensor 54 is configured to produce a force signal, which is indicative of the force applied by DEA 40 to the endocardial tissue of heart 26. In some examples, the force sensor may comprise a magnetic field transmitter and receiver connected by a spring in DEA 40, and may generate an indication of the force based on measuring the deflection of the spring. Further details of this sort of catheter and force sensor are described in U.S. Patent Application Publication Nos. 2009/0093806 and 2009/0138007. In other examples, force sensor 54 may comprise any other suitable type of force sensor.

In the present example, ablation electrode 55 is positioned at the tip of DEA 40 and is placed in contact with the endocardial tissue of heart 26, so that the force signal is indicative of the force applied between ablation electrode 55 and the endocardial tissue of heart 26.

Reference is now made back to the general view of FIG. 1. In some examples, PIU 44 is connected to a power source, such as a radiofrequency (RF) generator 49, which is packaged within the housing of PIU 44. In alternative examples, the RF generator may be external to the housing of PIU 44 and electrically connected to PIU 44 using a suitable cable. RF generator 49 is configured to apply suitable RF ablation signals.

In some examples, the proximal end of catheter 22 is connected, inter alia, to interface circuits (not shown) of PIU 44, for transferring the ablation signals from PIU 44 to electrode 55 and applying the ablation signals to tissue of heart 26. The interface circuits are further configured to transfer position signals between position sensor 39 and processor 33.

In some examples, system 20 comprises an indifferent electrode 48, also referred to herein as a patch electrode, which is attached to the skin of patient 28 (e.g., on the backside of patient torso) and is electrically connected to PIU 44 via a cable 21. In other examples, system 20 may comprise any suitable number of skin patches configured to adhere respective electrodes, e.g., about four or five electrodes, to the skin of patient 28.

In the context of the present disclosure and in the claims, the terms "about" or "approximately" for any numerical values or ranges indicate a suitable dimensional tolerance that allows the part or collection of components to function for its intended purpose as described herein.

In some examples, system 20 comprises a handle 32 used by physician 30 to navigate DEA 40 through the vasculature of patient 28 and into a target location for performing the ablation in heart 26, also referred to herein as an ablation site.

In some examples, the position of distal-end assembly 40 in the vasculature and heart 26 of patient 28 is measured using position sensor 39 of a magnetic position tracking system. In the present example, console 24 comprises a driver circuit 41, which is configured to drive magnetic field generators 36 placed at known positions external to patient 28 lying on table 29, e.g., below the patient's torso. The position sensor is coupled to the distal end, and is configured to generate position signals in response to sensed external magnetic fields from field generators 36. The position signals, also refers to herein as position measurements, are indicative of the position of DEA 40 in the XYZ coordinate system of the position tracking system.

This method of position sensing is implemented in various medical applications, for example, in the CARTO™ system, produced by Biosense Webster Inc. (Irvine, Calif.) and is described in detail in U.S. Pat. Nos. 5,391,199, 6,690,963, 6,484,118, 6,239,724, 6,618,612 and 6,332,089, in PCT Patent Publication WO 96/05768, and in U.S. Patent Application Publication Nos. 2002/0065455 A1, 2003/0120150 A1 and 2004/0068178 A1.

In some examples, the coordinate system of the position tracking system is registered with the coordinate systems of system 20 and map 27, so that processor 33 is configured to display, the position of distal-end assembly 40, over the anatomical or EA map (e.g., map 27).

In some examples, processor 33, typically comprises a general-purpose computer, which is programmed in software to carry out the functions described herein. The software may be downloaded to the computer in electronic form, over a network, for example, or it may, alternatively or additionally, be provided and/or stored on non-transitory tangible media, such as magnetic, optical, or electronic memory.

This particular configuration of system 20 is shown by way of example, in order to illustrate certain problems that are addressed by examples of the present disclosure and to demonstrate the application of these examples in enhancing the performance of such a system. Examples of the present disclosure, however, are by no means limited to this specific sort of example system, and the principles described herein may similarly be applied to other sorts of medical systems configured to be used for other sorts of tissue ablation procedures.

Calculating and Visualizing Ablation Stability Quality Index

FIG. 2 is a diagram illustrating annotations of ablation sites 52 and 53 on map 27 of heart 26, in accordance with examples of the present disclosure. Note that ablation sites 52 and 53 comprise an enlarged view of respective ablation sites displayed by processor 33 on map 27. An example method for producing the annotations is described in FIG. 4 below.

In some examples, each annotation comprises: (i) an icon, such as icons 50 and 51, in ablation sites 52 and 53, respectively, and (ii) a table, such as tables 56 and 57, in ablation sites 52 and 53, respectively. Tables 56 and 57 comprise calculated quality indices 58 and 59, respectively, which are indicative of the stability of the ablation procedure carried out at ablation sites 52 and 53, respectively. In the context of the present disclosure and in the claims, the terms "quality index" and "stability quality index" are used interchangeably and refer to any suitable type of a quantitative size or figure or metric indicative of the stability of the tissue ablation, as will be described in detail in insets 60 and 61 below.

Reference is now made to insets 60 and 61 illustrating the calculation of quality indices 58 and 59 and the production of icons 50 and 51, respectively. Note that icons 50 and 51 are also referred to herein as visitags or visitag icons, and are generated using a software referred to herein as a VisiTag™ module, which produced by Biosense Webster Inc. (Irvine, Calif.). The visitag is typically displayed over map 27 of heart 26 and provides physician 30 with a visual representation of a respective ablation lesion formed during the ablation procedure. Examples related to the calculation, display, and utilization of the visitag, are described in more detail, for example, in U.S. Pat. Nos. 9,498,147 and 9,757,182.

In some examples, when physician 30 begins the tissue ablation, s/he places ablation electrode 55 in contact with tissue of heart 26 at a first position 64 (e.g., position 64a or position 64b) of the respective ablation site (e.g., ablation site 52 or ablation site 53). In the present example, based on a position signal received from position sensor 39, processor 33 is configured to generate a spherical-shaped or a spheroid-shaped icon 66 whose calculated center-of-mass (COM) is position 64a. In the present example, icon 66 has a radius of about 2 mm, but in other examples, icon 66 may have any other suitable size and/or shape.

In some cases, while physician 30 applies the ablation signals to the tissue at ablation site 52, ablation electrode 55 may be moved relative to position 64a. The relative movement may comprise respiratory movements of patient 28, and/or other movement of DEA 40 relative to position 64a at the respective ablation site. In some examples, while planning the ablation, physician 30 defines for each ablation site intended to receive the ablation signals, a set of thresholds stored in processor 33, such as but not limited to: (i) a minimal contact force between DEA 40 and the tissue while applying the ablation signals (e.g., larger than about 5 gram force) (ii) a minimal duration of ablation signals application (e.g., between about 3 seconds and 5 seconds), (iii) a maximal distance (e.g., about 2 mm or any other suitable size) between a reference position, e.g., position 64a (also referred to herein as a first position) and a second (different) position in which ablation electrode 55 is located while applying the ablation signals, (iv) a maximal velocity (e.g., about 2.5 mm per second) of the movement of ablation electrode 55 between the first and second positions, and (v) a maximal value of the stability quality index.

Note that during the ablation procedure, physician 30 typically defines multiple ablation sites that are intended to produce an ablation line, which is spatial trajectory of the ablation sites, for blocking undesired propagation of an electrophysiological wave through the tissue intended to be ablated. Subsequently, physician 30 applies ablation signals to the cardiac tissue discretely, site-by-site, using ablation electrode 55. In some cases, due to instability of the ablation, one or more sites (such as ablation sites 52 and/or 53) may not receive the desired ablation signal (e.g., due to undesired movement of DEA 40 and/or insufficient ablation power, duration or contact force) in the cardiac tissue during ablation along the planned ablation line. The ablation instability may result in one or more openings, also referred to herein as gaps, in the ablation line. If gaps are present, the cardiac dysfunction may not be alleviated by the procedure. Thus, while applying the ablation signals, every undesired movement of ablation electrode 55 reduces the stability and the quality of the lesion formed at the respective ablation site.

Reference is now made to inset 60. In the case shown in inset 60, while applying the ablation signals to the tissue at ablation site 52, ablation electrode 55 has been moved from position 64a (i.e., the first position or reference position) to a position 67 (e.g., the second position). In some examples, based on position signals from position sensor 39, processor 33 is configured to calculate a vector 65, which is indicative of the direction and an average distance between positions 64a and 67. Note that during the tissue ablation at ablation site 52, ablation electrode 55 is supposed to be at the same place (e.g., position 64a) during all the time in which the ablation signals are applied (and not, for example, move along an ablation line).

In other examples, instead of vector 65, processor 33 is configured to calculate the average distance between positions 64a and 67, which is indicative of the quality index described above. For example, quality index 58 of table 56 is based on the average distance calculated between positions 64a and 67.

In some examples, based on the position signals and suitable algorithms, processor 33 is configured to exclude the respiratory movement of patient 28 and to calculate the average size of vector 65. One implementation of such algorithms is described, for example, in U.S. patent application Ser. No. 17/188,844, in which the processor receives respiration data and probe location data, identifies periods when the probe is stable relative to a boundary of the heart cavity, and using an algorithm to notify a surgeon of time intervals in which the probe is stable relative to the cavity boundary. Such algorithm may be used for excluding the respiration movement and remaining with the movement of the probe relative to the cavity boundary, which is not related to the respiration.

Additionally, or alternatively, quality index 58 may be based on any quantitative size comprising any suitable type of calculated (e.g., average, median, maximal) distance, velocity, and a combination of the calculated distance and velocity, of the movement of DEA 40 (and ablation electrode 55) relative to position 64a.

In some examples, based on: (i) the positions of ablation electrodes 55 received from position sensor 39 while applying the ablation signals, and (ii) the stored thresholds described above, processor 33 is configured to estimate the quality index, which is indicative of the stability of the ablation at the respective ablation site.

In the example of ablation site 52, the quality index equals about 0.68 mm, which is smaller than the threshold of the stability quality index, and therefore, indicative of a sufficiently stable ablation at ablation site 52.

Reference is now made back to inset 61. In some examples, based on the position signals received from position sensor 39, and after excluding the respiratory movement of patient 28, processor 33 is configured to calculate (i) position 68 and distance 69 (between positions 64b and 68), and (ii) position 70 and distance 71 (between positions 64b and 70). In some examples, based on the calculated distances (and optionally the calculated movement velocity of DEA 40 within ablation site 53), processor 33 is configured to estimate quality index 59, which is indicative of the ablation stability within ablation site 53. As described for ablation site 52 above, during the tissue ablation at ablation site 53, ablation electrode 55 is supposed to be at the same place during all the time in which the ablation signals are applied to the tissue. Therefore, a smaller distance between position 64b and other measured positions of ablation electrode 55, is typically indicative of a stable ablation procedure at the respective ablation site.

Reference is now made back to the general view of FIG. 2. As shown in table 57, quality index 59 has a value of about 2.25 mm, which exceeds the threshold of the stability quality index, and therefore, is indicative of insufficient stability of the ablation procedure at ablation site 53.

In some examples, processor 33 is configured to display a halo 72, which is surrounding icon 51 and is displayed immediately upon identifying that quality index 59 exceeds the threshold of the stability quality index. In the present example, both icons 50 and 51 have the same shape and size (e.g., a pseudo-3D ball having a radius of about 2 mm or any other suitable radius), and as described above, provides physician 30 with a visual representation of the ablation lesions for assisting physician 30 in planning and executing of the ablation strategy by displaying one or more parameters of the lesion formation.

In some examples, in response to the display of halo 72, physician 30 typically immediately terminates the application of the ablation signals. In the present example, halo 72 is typically displayed for about 3 seconds (or any other suitable time interval) for indicating to physician 30 that the ablation stability has been broken at ablation site 53. In some examples, at the same time, processor 33 is configured to start the calculation and estimation of the stability of a new developing ablation site (e.g., adjacent to ablation site 53), and to display a new icon (not shown), which is indicative of the stability of the ablation procedure at the new ablation site.

Additionally, or alternatively, processor 33 is configured to visualize the quality index by assigning to icons 50 and 51 suitable colors indicative of the estimated quality index. In the example of FIG. 2, processor 33 is configured to apply to icon 50 a dark gray color, which is indicative of a stable ablation, and a lighter color at edges 73 for illustrating small movements (of a fraction of a millimeter), such as the movement from position 64a to position 67.

In some examples, based on the position signals received from position sensor 39, and after excluding the respiratory movement of patient 28, processor 33 is configured to calculate and display one or more contours, such as contours 62 and 63, which are based on the positions visited by ablation electrode 55. Processor 33 is further configured to display, e.g., in tables 56 and 57, selected figures that are related to the ablation procedure carried out at ablation sites 52 and 53, respectively.

This particular configuration of the graphical user interface (GUI) displayed on display 35 is shown by way of example, in order to illustrate certain problems that are addressed by examples of the present invention and to demonstrate the application of these examples in enhancing the performance of system 20 during tissue ablation procedures. Examples of the present invention, however, are by no means limited to this specific sort of example GUI and/or system, and the principles described herein may similarly be applied to other sorts of GUIs in any suitable types of medical systems and procedures. For example, processor 33 is configured to display other suitable types of graphical elements instead of or in addition to halo 72, the visitag icons (icons 50 and 51), the color of the visitag icons, and contours 62 and 63.

Figure 3:
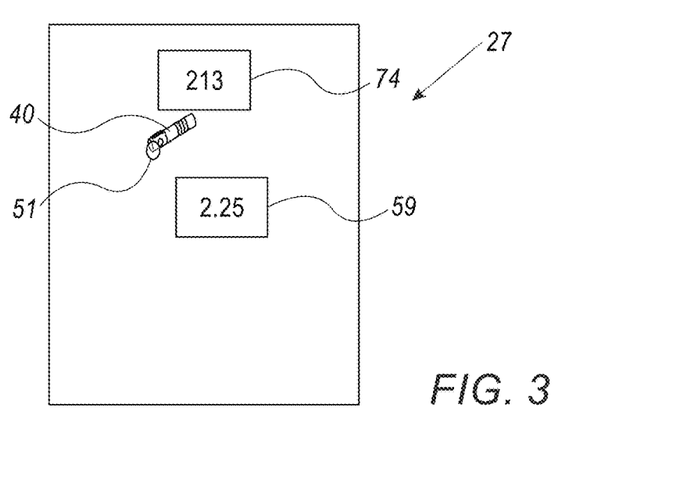
FIG. 3 is a diagram illustrating annotation of ablation parameters on a map of patient heart, in accordance with another example of the present disclosure.

FIG. 3 is a diagram illustrating annotation of ablation parameters on map 27 of heart 26, in accordance with another example of the present disclosure.

While applying the ablation signals to the tissue of heart 26, e.g., at ablation site 53, the gaze of physician 30 must typically be focused on the ablation site shown on map 27 and cannot look at other elements shown on display 35. In some examples, processor 33 is configured to display, over map 27, ablation stability quality index and/or any other parameters related to the ablation procedure. In the example of FIG. 3, processor 33 displays: (i) distal-end assembly 40, (ii) icon 51 (visitag), (iii) ablation stability quality index 59, and (iv) an ablation index 74, which is a calculation combining the main parameters of the ablation signals (e.g., contact force, power, and duration of the ablation signal) applied to the tissue of heart 26 at ablation site 53 (and/or any other ablation site).

In other examples, in addition to or instead of the visitag, the ablation stability quality index and the ablation index, processor 33 is configured to display over map 27, any other suitable types of graphical elements indicative of other parameters related to the ablation procedure. For example, temperature and impedance measured at the ablation site, and contact force between DEA 40 and the ablated tissue, may be displayed as annotations over DEA 40 and map 27.

Figure 4:
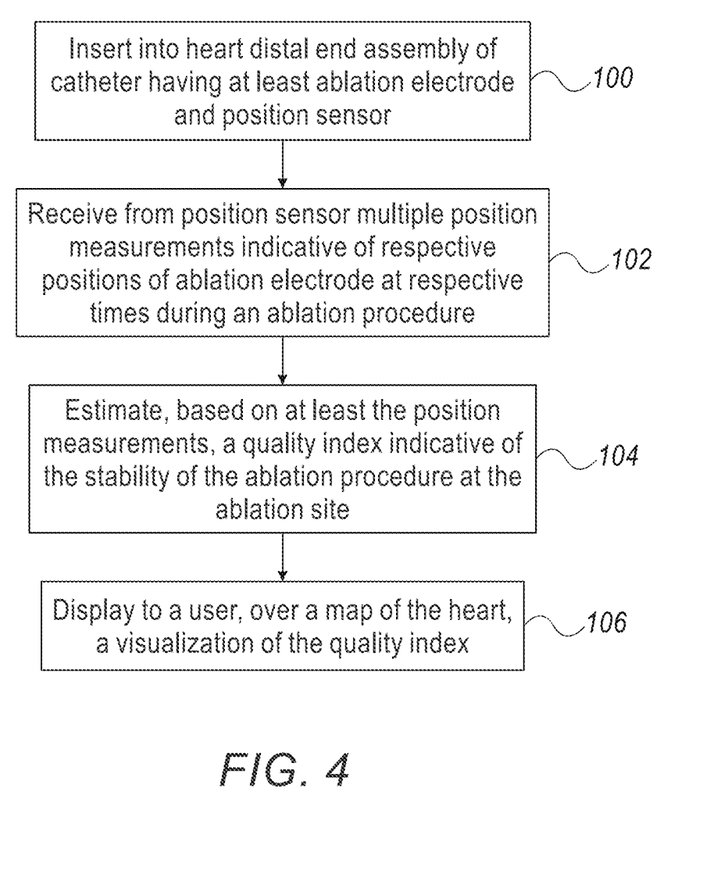
FIG. 4 is a flow chart that schematically illustrate a method for calculating and visualizing an ablation stability quality index over the map of patient heart, in accordance with an example of the present disclosure.

FIG. 4 is a flow chart that schematically illustrate a method for calculating and visualizing ablation stability quality index 59 over map 27 of heart 26, in accordance with an example of the present disclosure.

The method begins at a catheter insertion 100, with physician 30 inserting DEA 40 of catheter 22 having at least ablation electrode 55 and position sensor 39, as described in FIG. 1 above.

At a position signal receiving step 102, processor 33 receives from position sensor 39, multiple position measurements indicative of respective positions of ablation electrode 55 at respective times during the ablation procedure, e.g., at ablation site 53, as described in detail in FIGS. 1 and 2 above.

At an ablation stability estimation step 104, based on (i) the position signals received from position sensor 39 and (ii) stored thresholds of at least one of: (a) the allowed distance (e.g., average distance of about 2 mm), and (b) the allowed velocity (e.g., maximal velocity of about 2.5 mm per second), processor 33 estimates (e.g., calculates) ablation stability quality index 59, as described in detail in FIG. 2 above.

At a displaying step 106 that concludes the method, processor 33 displays over map 27, e.g., to physician 30, a visual indication of the ablation stability quality index at the respective ablation site, as described in detail in FIGS. 2 and 3 above.

In some examples, processor 33 assigns to the visitag icons (e.g., icons 50 and 51) a color indicative of the value of the respective ablation stability quality index relative to a threshold of the ablation stability quality index. For example, as shown in FIG. 2 above, processor 33 assigns: (i) a first color to icon 50—indicating that the value of ablation stability quality index 58 is smaller than the threshold of the ablation stability quality index, and (ii) a second (different) color to icon 51—indicating that the value of ablation stability quality index 59 exceeds the threshold of the ablation stability quality index.

Additionally, or alternatively, in response to identifying that the value of ablation stability quality index 59 exceeds the threshold of the ablation stability quality index, processor 33 displays halo 72 around icon 51. In the present example, halo 72 is displayed for about 3 seconds and indicates termination of the ablation at the location marked by icon 51, and immediately after halo 72 disappears, processor 33 produces a new visitag whose calculated center-of-mass is at the measured present position of ablation electrode 55. These annotations (e.g., halo 72 and new visitag) provide physician 30 with an indication of the stability and status of the ablation procedure at ablation site 53, as described in detail in FIG. 2 above.

Moreover, in case the estimated distance of a given position of ablation electrode 55 (during the ablation) from a reference position (e.g., position 64b) exceeds the distance threshold, processor 33 calculates and displays one or more contours, such as contours 62 and 63. The displayed contours are based on the positions visited by ablation electrode 55 and are indicative of the respective contours travelled by DEA 40 and ablation electrode 55 while applying the ablation signals to the tissue at ablation site 53.

Additionally, or alternatively, processor 33 displays to physician 30, tables 56 and 57 and respective values of the calculated ablation stability quality indices 58 and 59, as described in FIG. 2 above. In alternative examples, processor 33 displays over map 27 any suitable information selected by physician 30. For example, processor 33 displays over map 27 at ablation site 53: (i) distal-end assembly 40, (ii) icon 51, (iii) ablation stability quality index 59, and (iv) ablation index 74, and/or any other suitable information as described in FIG. 3 above.

Although the examples described herein mainly address the visualization of the stability quality index of tissue ablation in patient heart 26, the methods and systems described herein can also be used in other applications, such as in visualizing tissue ablation and lesion formation in any other organ of patient 28 and in any assessment of lesions.

Example 1

A system (20) including a display (35) and a processor (33), which is configured to: (i) receive multiple position measurements indicative of respective positions of an ablation electrode (55) at respective times during an ablation procedure at an ablation site (52, 53) in an organ (26) of a patient (28), (ii) estimate, based at least on the multiple position measurements, a quality index (58, 59) indicative of a stability of the ablation procedure at the ablation site (52, 53), and (iii) visualize the quality index (58, 59) to a user (30) on the display (35).

Example 2

The system according to example 2, wherein the processor is configured to estimate the quality index depending on respective distances of at least some of the positions from a reference position.

Example 3

The system according to example 2, wherein the reference position includes a first position of the ablation electrode when applying a first ablation signal to the organ at the ablation site, and wherein the at least some of the positions include one or more second positions of the ablation electrode when applying to the organ, at the ablation site, one or more respective second ablation signals, which are subsequent to the first ablation signal.

Example 4

The system according to example 2, wherein, in response to identifying that the quality index exceeds a threshold, the processor is configured to display a contour including the some of the positions.

Example 5

The system according to examples 1 through 4, wherein the processor is configured to estimate a velocity of the ablation electrode during the ablation procedure, and to estimate the quality index depending on the velocity.

Example 6

The system according to examples 1 through 4, wherein, in estimating the quality index, the processor is configured to exclude respiratory movement of the patient.

Example 7

The system according to examples 1 through 4, wherein the processor is configured to visualize the quality index by displaying an icon at the ablation site, and by assigning to the icon a color indicative of the estimated quality index.

Example 8

The system according to example 7, wherein the icon includes a spheroid.

Example 9

The system according to example 7, wherein, in response to identifying that the quality index exceeds a threshold, the processor is configured to alter the color of at least part of the icon.

Example 10

The system according to example 7, wherein, in response to identifying that the quality index exceeds a threshold, the processor is configured to display a halo surrounding the icon.

Example 11

A method, including:
(i) receiving multiple position measurements indicative of respective positions of an ablation electrode (55) at respective times during an ablation procedure at an ablation site (52, 53) in an organ (26) of a patient (28),
(ii) estimating, based at least on the multiple position measurements, a quality index (58, 59) indicative of a stability of the ablation procedure at the ablation site (52, 53), and
(iii) visualizing the quality index (58, 59) to a user (30).

Example 12

The method according to example 11, wherein estimating the quality index depends on respective distances of at least some of the positions from a reference position.

Example 13

The method according to example 12, wherein the reference position includes a first position of the ablation electrode when applying a first ablation signal to the organ at the ablation site, and wherein the at least some of the positions include one or more second positions of the ablation electrode when applying to the organ, at the ablation site, one or more respective second ablation signal, which are subsequent to the first ablation signal.

Example 14

The method according to example 13, wherein visualizing the quality index includes, in response to identifying that the quality index exceeds a threshold, displaying a contour including the some of the positions.

Example 15

The method according to examples 11 through 14, wherein estimating the quality index includes: (i) estimating a velocity of the ablation electrode during the ablation procedure, and (ii) estimating the quality index depending on the velocity.

Example 16

The method according to examples 11 through 14, wherein estimating the quality index includes excluding respiratory movement of the patient.

Example 17

The method according to examples 11 through 14, visualizing the quality index includes displaying an icon at the ablation site, and assigning to the icon a color indicative of the estimated quality index.

Example 18

The method according to example 17, wherein displaying the icon includes displaying a spheroid.

Example 19

The method according to example 17, wherein displaying the icon includes altering the color of at least part of the icon in response to identifying that the quality index exceeds a threshold.

Example 20

The method according to example 17, wherein displaying the icon includes displaying a halo surrounding the icon in response to identifying that the quality index exceeds a threshold.

It will be appreciated that the examples described above are cited by way of example, and that the present disclosure is not limited to what has been particularly shown and described hereinabove. Rather, the scope of the present disclosure includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A system for analyzing and visualizing a stability quality index during an ablation procedure, comprising:
   a catheter carrying one or more ablation electrodes and a position sensor, the catheter being inserted into a heart of a patient, the one or more ablation electrodes configured to perform an ablation procedure at an ablation site in the heart of the patient, the position sensor producing position signals indicative of the position measurements of the one or more ablation electrodes;
   a display; and
   a processor, coupled with an ablation electrode of the one or more ablation electrodes the processor configured to:
      receive, from the position sensor, multiple position measurements indicative of respective positions of the ablation electrode at respective times during the ablation procedure;
      exclude respiratory movement of the patient;
      store thresholds indicative of the allowed distance between the ablation site and the multiple position measurements, the allowed velocity of the ablation electrode relative to the ablation site, and the stability quality index;
      estimate, based at least on the multiple position measurements, a stability quality index indicative of a stability of the ablation electrode during the ablation procedure at the ablation site;
      visualize on the display, an electro-anatomical (EA) map of the heart, the EA map including the ablation site;
      visualize on the display, an icon at a location corresponding to the position of the ablation electrode while starting the application of ablation signals to a user, on the EA map,
   wherein the processor is configured to estimate the quality index based on respective distances of at least some of the positions from a reference position and on respective velocities of the ablation electrode during the application of ablation signals,
   wherein the reference position comprises a first position of the ablation electrode when applying a first ablation signal to the heart at the ablation site, and wherein the at least some of the positions comprise one or more second positions of the ablation electrode when applying to the heart, at the ablation site, one or more respective second ablation signals, which are subsequent to the first ablation signal, and
   the processor is further configured to display a halo surrounding the icon, in response to identifying that the respective quality index exceeds the stored thresholds of the stability quality index, wherein the halo surrounding the icon is displayed for a predetermined time until a new ablation icon is displayed, the new ablation icon being located at a position of the ablation electrode after being moved away from the position of the previous icon.

2. The system according to claim 1, wherein the processor is configured to estimate a velocity of the ablation electrode during the ablation procedure, and to estimate the quality index depending on the velocity.

3. The system according to claim 1, wherein the icon comprises a spheroid.

4. The system according to claim 1, wherein, in response to identifying that the quality index exceeds a threshold, the processor is configured to alter the color of at least part of the icon.

* * * * *